July 25, 1933.   W. J. B. LEECH ET AL   1,919,955
GAS OFFTAKE APPARATUS
Filed Aug. 19, 1929   3 Sheets-Sheet 3
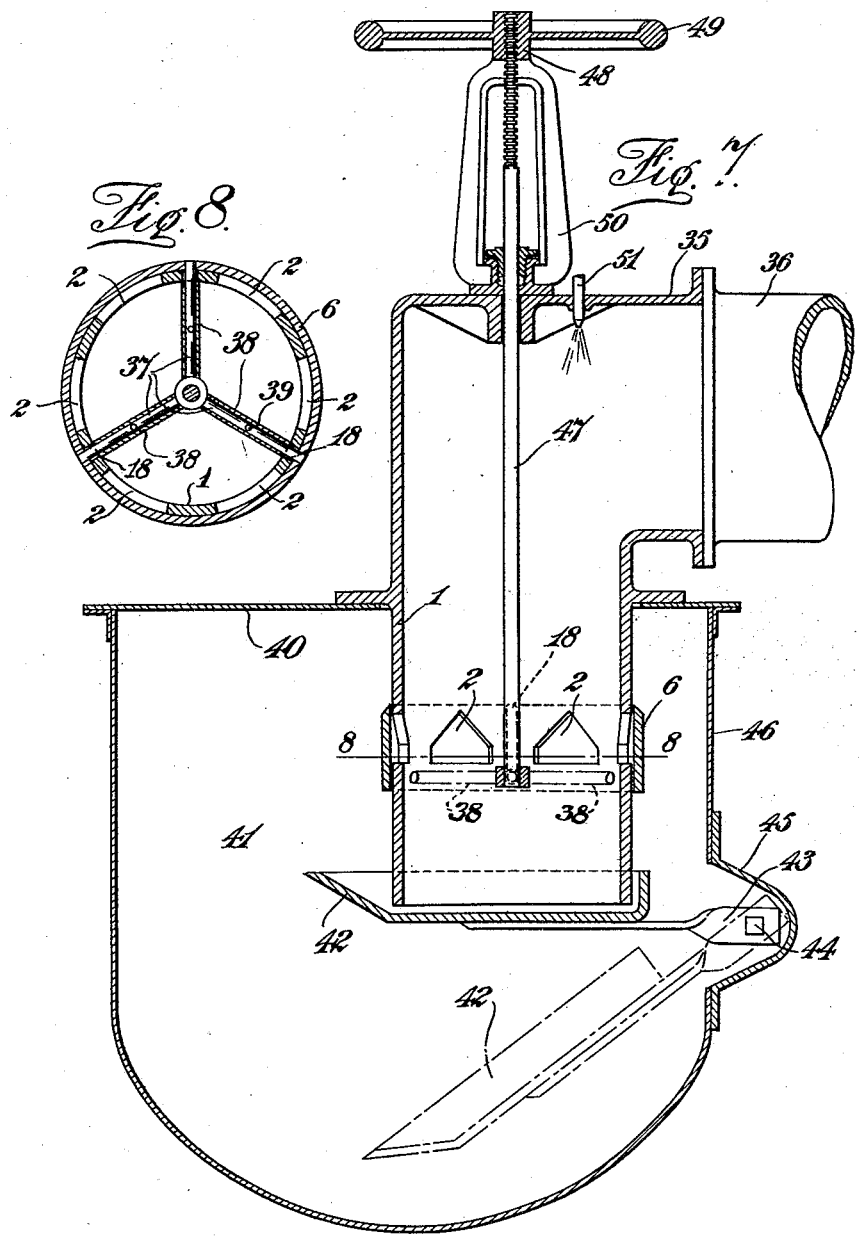
INVENTORS
W. J. B. LEECH
S. HAY
H. HOLLINGS
B. E. BURTON
BY
ATTORNEY Patented July 25, 1933

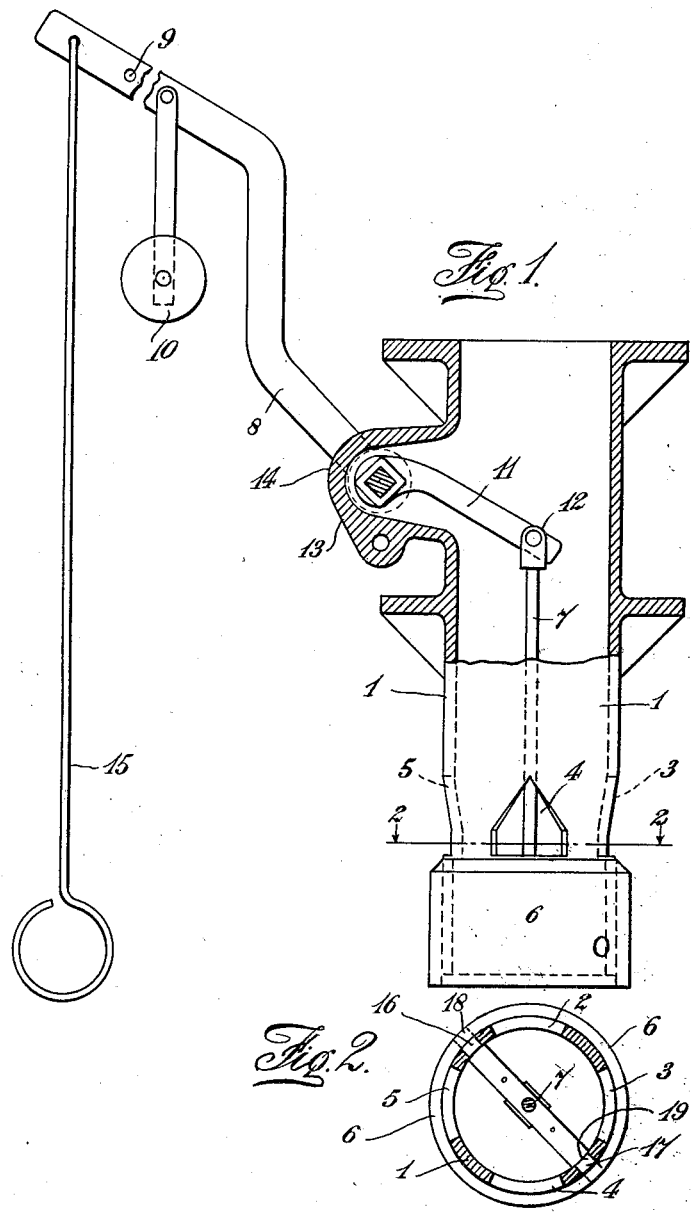

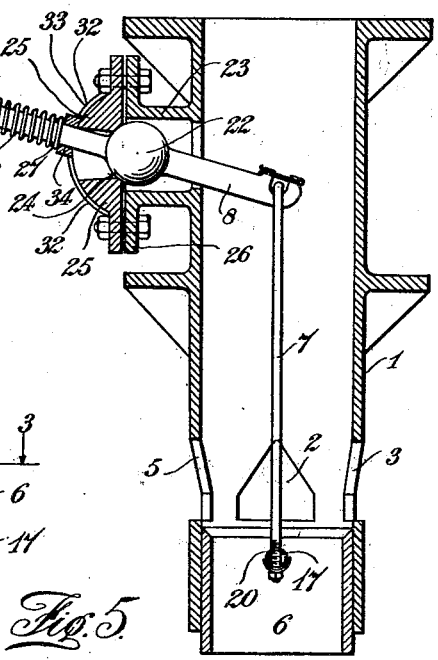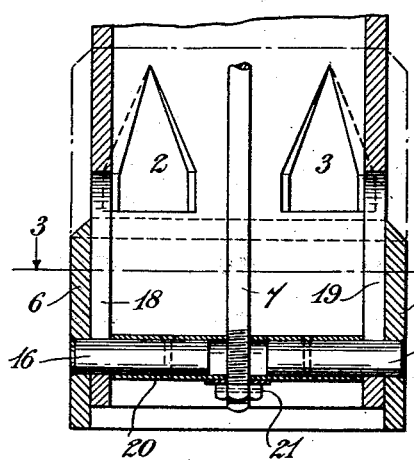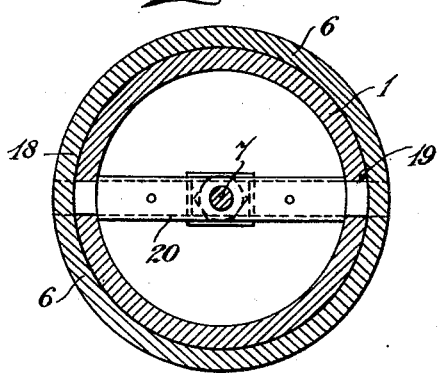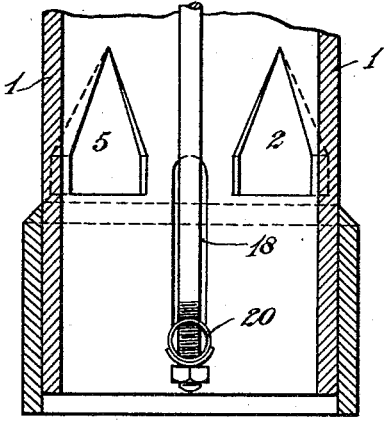

1,919,955

UNITED STATES PATENT OFFICE

WILLIAM JAMES BEAVER LEECH, STEPHEN HAY, HAROLD HOLLINGS, AND ALBERT EDWIN BURTON, OF LONDON, ENGLAND

GAS OFFTAKE APPARATUS

Application filed August 19, 1929, Serial No. 386,937, and in Great Britain December 3, 1928.

This invention relates to liquid seals such as are used in the carbonization of coal and more particularly to seal pipes for use in association with liquid seals for coke ovens and gas retorts, and the present invention has for its object to provide an improved construction of liquid seal pipe which is adapted for use in connection with hydraulic mains of gas plant as well as in connection with the collecting mains and/or liquid seals of coke ovens and by means of which the pressure can be controlled in a gas retort or coke oven, or in gas retorts or in coke ovens throughout the various stages of carbonization of the coal therein.

The invention is hereinafter described in its application to a hydraulic main such as is used in the carbonization of coal in coal-gas plants from which its application to liquid seals in general and to the collecting main or mains of a coke-oven or coke-ovens will be readily understood. The term "retort" as hereinafter used is intended therefore to cover also a coke-oven or other apparatus wherein a liquid seal is required to control the pressure in a chamber associated therewith and the context should be construed in accordance therewith.

According to the present invention a liquid seal is associated with one or more than one chamber in such manner that the pressure in the said chamber is controlled by the relative displacement of a dip or seal pipe and a member associated therewith such relative displacement resulting in the covering or uncovering of one or more than one opening in the wall of the dip or seal pipe or in the member associated therewith. The associated member hereinafter referred to as the closure member may be disposed externally or internally of the dip or seal pipe and the latter may be movable and the closure member may be stationary or vice versa or both the dip or seal pipe and the closure member may be movable, the relative movement in such arrangement effecting the covering or uncovering of the hole or holes in the dip or seal pipe. Conveniently however the closure member is displaceable along the dip or seal pipe by mechanically or manually operated means. When the closure member which is preferably disposed outside the dip or seal pipe and is displaceable lengthwise of the dip or seal pipe is mechanically operated such mechanical operation may be effected in accordance with the method described and claimed in the specification of prior British Patent No. 302437 dated October 6th 1927. In the manual operation of the aforesaid closure member such manual operation may be effected by a rockable lever of any suitable type or by a ball supported lever the ball being retained against a suitable seat by the action of a spring or equivalent device. The opening or openings in the dip or seal pipe may be of any suitable contour as for example a triangular contour or a combined triangular and rectangular contour. Where more than one hole is provided the bases of the triangular or other shaped holes are preferably level with the normal level of the liquor in the hydraulic or collecting main and the top of the movable closure member is set, when the valve is fully open, at the level at which the normal working seal is determined. The movable closure member is so constructed that it slides freely outside or within the dip pipe while maintaining a gas-tight joint, thereby sealing the retort associated chamber completely from the hydraulic or collecting main, when the hole or holes are fully covered. The size of each opening is so determined that their combined area is equivalent to, or greater than the area of the delivery or ascension pipe to which the dip pipe is attached, so as to permit of a free and unrestricted flow of gas during the period of maximum gasification, and by displacing the closure member or the dip pipe or both to predetermined positions, the combined area of the openings can be so controlled that the pull on any chamber or chambers or retorts is maintained at a substantially even level during the whole period of gasification or by the application of the means and the method described and claimed in British Patent No. 302437, this object can be more regularly obtained.

When it is desired to use the construction of dip pipe hereinafter described for carrying out the method according to the prior patent above referred to then the dip-pipe itself may be operated to effect the opening or closing or partial opening or closing of the opening or openings in the dip-pipe or the closure member may be operated by the mechanical means in accordance with the description in the prior specification aforesaid.

In order that the invention may be clearly understood and readily carried into effect, reference is made to the accompanying drawings which show diagrammatically and by way of example constructions of dip-pipes in accordance with the present invention.

Figure 1 is an elevation of a liquid seal and a dip-pipe or seal pipe therefor in accordance with the present invention and as applied to a hydraulic main of a plant for use in the manufacture of coal gas.

Figure 2 is a sectional plan on the line 2—2, Figure 1.

Figure 3 drawn to an enlarged scale is a sectional elevation of the lower part of Figure 1.

Figure 4 is a sectional plan on the line 3—3 Figure 3.

Figure 5 is a sectional elevation at right angles to that shown in Figure 3.

Figure 6 is a sectional elevation of a modified constructional form.

Figure 7 shows a vertical section of a liquid seal in accordance with the present invention as applied to a coke oven collecting means.

Figure 8 is a cross section on the line 8—8 Figure 7.

Referring to Figures 1 to 5 both inclusive, 1 is the dip-pipe having one or more than one opening 2 in the thickness of the pipe. In the drawings four such openings are shown, see Figure 2, these openings being numbered respectively 2, 3, 4, and 5. Surrounding the dip-pipe is a closure member 6 to which is attached a rod 7 carrying at its upper end a lever 8. The lever 8 is provided with a plurality of holes 9, and carries a weight 10 adjustable along the lever 8. The lever 8 in Figure 1 is preferably formed in two parts 8, 11, one of which the part 11 is pivotally connected to the rod 7 as at 12, and the outer end of the lever 11 is rigidly secured to a pivot pin 13 rockably supported in a housing 14 forming an enlargement of the dip-pipe 1. Suitably secured to the lever 8 is a manipulating rod 15. The member 6 as will be seen more particularly from Figures 1, 3 and 5 is disposed outside the dip-pipe 1 but such member may be disposed inside the dip-pipe 1, as found more convenient. Each opening is of such an area that when the member 6 is in its lowest position the maximum amount of opening is provided for the escape of gas immediately after charging the retort. The area of each opening at its lower end may remain constant for a certain distance upward of the opening the area thereafter gradually decreasing by forming the sides of the opening of a converging conicity. As shown in the drawings the openings are partly rectangular and partly triangular but it should be clearly understood that the opening as well as the width and the converging conicity can be varied to suit the requirements of any particular type of coal to be subjected to carbonization. The actual shape, length and width of each opening either of its triangular portion or of its rectangular portion or both can be predetermined by testing a sample of the coal which is to be carbonized, and ascertaining the quantity of gas given off during the early stages of gasification. Obviously the lever 8 or the rod 15 instead of being operated by hand may be provided at its lower end with a roller which may be actuated by cam mechanism in accordance with the method and means described and claimed in prior British Patent No. 302437 dated 6th October 1927. Where the lever 8 and rod 15 are manually operated then the escape of the gas evolved in the retort is dependent on the manual operation of either the pipe 1 or the displaceable member 6. When however the lever 8 or the rod 15 is operated by mechanical means such as the cam mechanism in the specification aforesaid then the movements of the displaceable member whether such member be the member 6 or the dip-pipe 1 are determined by the design and shape of such cams as may be provided to actuate the lever 8 or rod 15. In the latter case mechanically effected displacement of either the member 6 or of the dip-pipe 1 would control the pressure in the retort in a predetermined manner. The present invention may be used either to control the pressure in the retort by releasing the pressure therein by manually operating the lever 8 and/or rod 15 or the latter or the lever 8 may be mechanically operated so that the movement of the dip-pipe 1 or the displaceable member 6 governs the escape of gases from the retort in a predetermined manner. The rod 7 is connected to the displaceable member 6 by means of two short rods 16, 17, the outer ends of which are secured in the displaceable member 6 and passed through slots 18, 19, in the dip-pipe the short rods 16, 17, being connected or coupled together by a length of tubing or gas piping 20 through which the rod 7 passes and is connected thereto by a nut 21 engaging the corresponding screw-threaded lower end of the rod 7.

In Figure 6, the member 6 is shown as being inside the dip-pipe 1 in which arrangement the slots 18, 19, of Figure 3 are unnecessary. The construction however remains approximately the same. In this construction however a modified form of manipulating rod is shown such for showing the lever 8 provided with a spherical portion 22 which is housed in a casing 23 and seats against an arcuate edge 24 provided in a cover plate 25 which is suitably secured to a flange 26 on the casing 23. The cover plate 25 is provided preferably with a slight outward projecting annulus 27 forming a guide or support for a spring 28 surrounding the projecting annulus 27. The outer end of the spring is adjustably maintained in position by a collar 29 which is adjustable on the rod 8 and capable of being clamped thereon by two set screws 30, 31. The cover plate 23 is provided with ribs 32 extending in the direction of movement of the lever 8. Between the ribs 32, which also act as guides the cover plate 23 is of arcuate form as at 33 the centre of the curve being co-incident with the centre of the spherical portion 22. A cap 34 formed in one with the annulus 27 and of a form corresponding to that of the arcuate part 33 surrounds the lever 8 and acts as a steadying device for the movement of the lever 8. The latter may be made in one piece or in two or more pieces as found convenient.

In the modified constructional form shown in Figure 7, the same parts are marked with the same reference numerals as in Figures 1 to 6 inclusive. In the constructional Figure 7 however the pipe 1 is formed in one with a flanged pipe 35 which is suitably secured to a gas offtake pipe 36 in communication with a coke oven, not shown. It should be clearly understood however that the pipe 1 may be rigidly secured to the pipe 35 instead of being cast in one therewith. In Figures 1 and 4, four openings are shown in the pipe 1 whereas in Figure 8, six openings are shown. Any suitable number of openings may be used however and these openings may be of any convenient shape to suit the purpose of the present invention. The closure member 6 in the construction shown in Figure 8 is carried by three arms comprising solid rods 37 surrounded by tubular members 38 the tubes being secured to the solid rods 37 as by pins 39 passing through the solid rods and the tubes. The rods are extended at their outer ends to pass through slots such as 18 in the pipe 1 and these outer ends of the rod 37 are suitably secured to the closure member 6. The pipe 1 is suitably secured to the cover 40 of a coke oven collecting main 41 and the lower end of the pipe 1 dips into a trough or tray 42 mounted on a lever arm 43 which is tiltably supported on a rockable pin 44 secured in a housing 45. The latter is secured by any suitable means to the casing 46 of the collecting or hydraulic main 41. The closure member 6 in Figure 7 is raised and lowered by a screw-threaded rod 47 which passes through a correspondingly screw-threaded boss 48 on a hand wheel 49. 50 is a bracket interposed between the hand wheel 49 and the upper part of the pipe 35 the bracket however being secured to the pipe 35. 51 is the usual spraying nozzle and forms no part itself of the present invention. The closure member may be raised and lowered by any suitable means.

What we claim is:—

1. A gas offtake apparatus including in combination a gas collecting main, a dip pipe extending downwardly into the collecting main and formed in the lower portion thereof with a plurality of openings, a member open at each end and in slidable contact and movable relatively to the dip pipe, the contact between the slidable member and the dip pipe being sufficiently close to effect direct baffling of the openings in the dip pipe in whole or in part, and means to move the slidable member relatively to the dip pipe in order to control directly the escape of gas through the said openings.

2. A gas offtake apparatus including in combination a gas collecting main, a dip pipe extending downwardly into the collecting main and formed with a plurality of openings in the lower portion thereof, a member open at each end and in approximate contact with and slidable within the dip pipe and directly baffling the said openings in whole or in part when in selected positions in the dip pipe, and manually operable means to move the member relatively to the dip pipe and to the said openings.

3. A gas offtake apparatus including in combination a gas collecting main, a dip pipe extending downwardly into the collecting main, said dip pipe being formed with openings in the wall thereof having a combined area at least substantially equal to or greater than the transverse area of the dip pipe, a tubular member slidably cooperating with the dip pipe and movable to a position to partially or completely baffle the openings in the dip pipe, radially arranged arms carried by the tubular member and projecting within the dip pipe, a manually operable lever, and means connecting said arm and lever to cause operation of the tubular member in the actuation of the lever.

4. A gas offtake apparatus including in combination a gas collecting main, a dip pipe extending downwardly into the collecting main, said dip pipe being formed with openings in the wall thereof having a combined area at least substantially equal to or greater than the transverse area of the dip pipe, a tubular member slidably cooperating with the dip pipe and movable to a position to partially or completely baffle the openings in the dip pipe, and manually operable means to move the tubular member longitudinally of the dip pipe to control the openings for governing the escape of fluid therethrough and regulating the pressure in the gas collecting main.

5. A construction as defined in claim 4, wherein the openings are of varying dimensions vertically.

6. A construction as defined in claim 4, wherein the openings are of uniform dimensions for a portion of their length and of gradually decreasing dimensions vertically for the remainder of their length.

WILLIAM JAMES BEAVER LEECH.
STEPHEN HAY.
HAROLD HOLLINGS.
ALBERT EDWIN BURTON.